(12) United States Patent
Kimura

(10) Patent No.: US 7,835,620 B2
(45) Date of Patent: Nov. 16, 2010

(54) INFORMATION PROCESSING SYSTEM, INFORMATION OUTPUT APPARATUS AND METHOD, INFORMATION PROCESSING APPARATUS AND METHOD, RECORDING MEDIUM, AND PROGRAM

(75) Inventor: Hitoshi Kimura, Kanagawa (JP)

(73) Assignee: Sony Corporation (JP)

( * ) Notice: Subject to any disclaimer, the term of this patent is extended or adjusted under 35 U.S.C. 154(b) by 1602 days.

(21) Appl. No.: 10/265,022

(22) Filed: Oct. 4, 2002

(65) Prior Publication Data

US 2003/0088871 A1    May 8, 2003

(30) Foreign Application Priority Data

Oct. 4, 2001    (JP)    ............... 2001-308274

(51) Int. Cl.
H04N 5/91    (2006.01)
H04N 7/00    (2006.01)
(52) U.S. Cl. .......................................... 386/83; 386/46
(58) Field of Classification Search .................. 386/46, 386/83
See application file for complete search history.

(56) References Cited

U.S. PATENT DOCUMENTS

2001/0039656 A1* 11/2001 Nakamura et al. ............. 725/9
2002/0054752 A1*  5/2002 Wood et al. .................... 386/83

FOREIGN PATENT DOCUMENTS

| JP | 11-282875 | 10/1999 |
| JP | 11-328275 | 11/1999 |
| JP | 2000-059745 A | 2/2000 |
| JP | 2000-293539 A | 10/2000 |
| JP | 2000-348039 | 12/2000 |
| JP | 2001-014349 | 1/2001 |
| JP | 2001-160955 A | 7/2001 |
| WO | WO-01/60064 | 8/2001 |

OTHER PUBLICATIONS

Cetintemel U et al: "Self-adaptive user profile for large-scale data delivery" Data Engineering, 2000. Proceedings. 16th International Conference on San Diego, CA, USA Feb.29-Mar. 3, 2000, Los Alamitos, CA, USA,IEEE Comput. Soc, US, Feb. 29, 2000, pp. 622-633.
Shapira B et al: "Stereotypes in information filtering systems" Information Processing & Management, Elsevier, Barking, GB, vol. 33, No. 3, May 1997, 273-287.

* cited by examiner

Primary Examiner—Marsha D Banks Harold
Assistant Examiner—Oluwaseun A Adegeye
(74) Attorney, Agent, or Firm—Lerner, David, Littenberg, Krumholz & Mentlik, LLP

(57) ABSTRACT

An unbroadcast program is recommended to a user. A server is supplied with degree of preference data as indices of the taste of users for programs from user terminals, and calculates, based on this, correlations of the preference tendencies for the programs of other users using a service. The user terminal displays an electronic program table transmitted from the server, and when a reservation to view or record is input from the user, reservation information is transmitted to the server. The server calculates predicted values of degrees of preference of the respective users for programs to be broadcast in the future on the basis of the correlations of the degrees of preference and the reservation information, and transmits them to the respective user terminals. The user terminal refers to the degree of preference predicted values of the broadcast scheduled programs, and prepares a list of programs to be recommended to the user.

23 Claims, 11 Drawing Sheets

FIG. 6

| USER ID | USER 1 | USER 2 | USER 3 | USER 4 | ... |
|---|---|---|---|---|---|
| | 01000351 | 01000352 | 01000353 | 01000354 | ........ |
| PROGRAM 1 | 0.12 | 0.97 | 0.25 | 0.13 | ........ |
| PROGRAM 2 | 0.54 | 0.11 | -0.40 | 0.52 | ........ |
| PROGRAM 3 | -0.43 | 0.65 | 0.34 | -0.39 | ........ |
| PROGRAM 4 | 0.01 | 0.55 | -0.10 | 0.02 | ........ |
| ......... | ........ | ........ | ........ | ......... | ......... |
| PRESERVATION PROGRAM 101 | 1 | 0 | 1 | 1 | ........ |
| PRESERVATION PROGRAM 102 | 0 | 1 | 1 | 0 | ........ |
| PRESERVATION PROGRAM 103 | 0 | 0 | 0 | 1 | |
| ......... | ........ | ........ | ......... | ......... | ......... |

TASTE  CHANNEL  VOLUME

"TASTE" PERFORMS PROGRAM PREFERENCE DEGREE SETTING, "CHANNEL" PERFORMS CHANNEL SETTING, AND "VOLUME" PERFORMS VOLUME SETTING
PROGRAM PREFERENCE DEGREE CAN BE SET IN THE RANGE OF, FOR EXAMPLE, -5 TO +5 BY PRESSING + OR - BUTTON OF "TASTE"
(IT IS CONVERTED INTO VALUE OF -1.0 TO +1.0 AS INNER DATA OF APPARATUS)

FIG. 8

| ITEM | ATTRIBUTE |
|---|---|
| USER ID | 01000351 |
| USER NAME | TARO SUZUKI |
| BIRTH DATE | JANUARY 1, 1970 |
| GENDER | MALE |
| ⋮ | ⋮ |

*FIG. 9*

| ITEM | PREFERENCE DEGREE |
|---|---|
| PROGRAM 1 | 0.12 |
| PROGRAM 2 | 0.54 |
| PROGRAM 3 | 0.43 |
| PROGRAM 4 | 0.01 |
| ⋮ | ⋮ |
| PRESERVATION PROGRAM 101 | 1 |
| PRESERVATION PROGRAM 102 | 0 |
| PRESERVATION PROGRAM 103 | 0 |
| ⋮ | ⋮ |

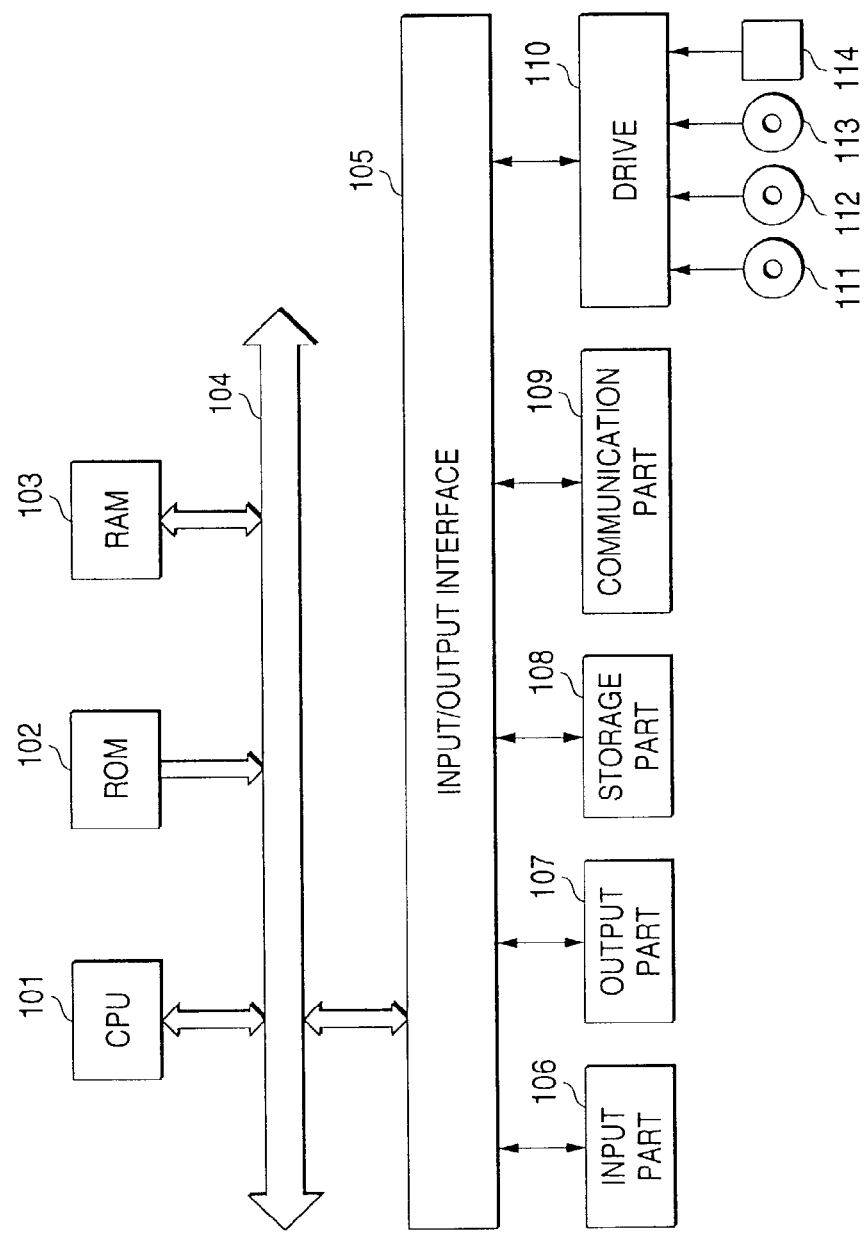

INFORMATION PROCESSING SYSTEM, INFORMATION OUTPUT APPARATUS AND METHOD, INFORMATION PROCESSING APPARATUS AND METHOD, RECORDING MEDIUM, AND PROGRAM

CROSS-REFERENCE TO RELATED APPLICATIONS

The present application claims priority from Japanese Application No. 2001-308274 filed Oct. 4, 2001, the disclosure of which is hereby incorporated by reference herein.

BACKGROUND OF THE INVENTION

The present invention relates to an information processing system, an information output apparatus and method, an information processing apparatus and method, a recording medium, and a program, and particularly to an information processing system in which an unevaluated new item can be recommended to a user, an information output apparatus and method, an information processing apparatus and method, a recording medium, and a program.

Conventionally, in an apparatus (hereinafter referred to as a recommendation apparatus) which selects (filters) information, a commodity, a service, a television program, a radio program or the like in accordance with an interest, taste or the like of each user, and recommends or provides it to each user, content based filtering or cooperation filtering has been used as the selection method.

For example, in the case where a book is selected from among plural books by content based filtering, and is recommended to a user, a keyword as a selection basis is previously set in the apparatus. When the filtering is performed, it is determined whether the previously set keyword exists in documents regarding books, and only a book containing the keyword in the document is selected and recommended to the user. Most conventional filtering adopts content based filtering.

Next, in the case where cooperation filtering is performed for plural books, first, a user group similar to a certain user in preference (books to be purchased are similar to each other) is previously specified. Then, a book selected by many users in the specified user group is recommended to the user.

However, in the recommendation apparatus adopting content based filtering, there has been a problem that selected items as objects of the filtering are limited to those which can be understood by a computer.

Besides, in the recommendation apparatus adopting content based filtering, there has been a problem that a judgment can be made based only on given information, such as a keyword, and a rule.

Further, in the recommendation apparatus adopting content based filtering, since an item recommended to a user is selected from among plural given selection items on the basis of a predetermined rule, there has been a problem that the item recommended to the user can be selected only from among the given items.

On the other hand, in the recommendation apparatus adopting cooperation filtering, a user group with a similar preference tendency is specified on the basis of the preference tendency of the user, and an item indicated by many users of the specified user group is recommended to the user, so that an object recommended to the user can be selected from among unspecific items.

However, in conventional recommendation apparatus adopting cooperation filtering, it is necessary that many users using the system evaluate plural items in advance, and there has been a problem that a load is imposed on the users. That is, for example, in the case of an apparatus for recommending a television program to a user, the user must evaluate a program each time he or she views the program, and this is very troublesome.

Besides, in conventional recommendation apparatus adopting cooperation filtering, there has been a problem that recommended items are limited to items already evaluated by other users. That is, for example, in the case where a television program is recommended to a user, although a program broadcast periodically, for example, every day or every week, or a program broadcast in series can be recommended, an unbroadcasted program has not been evaluated by users, and therefore cannot be recommended.

SUMMARY OF THE INVENTION

The present invention has been made in view of these circumstances, and has as an object to enable an unevaluated new item to be recommended to a user by calculating a predicted preference value for the new item on the basis of reservation information.

An information processing system of the invention includes an information output apparatus for outputting a recommended item; and an information processing apparatus for managing the reconnected item output by the information output apparatus. The information output apparatus includes a reception unit operable to receive designations of items from users; an acquisition unit operable to acquire a preference value of each user for a specified one of the items; a first transmission unit operable to transmit identification information for identifying the specified item and the preference values of the users for the specified item to the information processing apparatus through a network; a second transmission unit operable to transmit reservation information for the specified item and the identification information for the specified item to the information processing apparatus through the network when the designations of the specified item are designations of reservations of the specified item; a preparation unit operable to prepare the recommended item to be presented to a user on the basis of a predicted preference value transmitted from the information processing apparatus when the acquisition unit does not acquire the preference value of the user for the specified item; and a presentation unit operable to present to the user the recommended item prepared by the preparation unit. The information processing apparatus includes a first storage unit operable to store the identification information for the specified item transmitted from the information output apparatus and the preference value for each user for the specified item; a second storage unit operable to store the reservation information for the specified item transmitted from the information output apparatus and the identification information for the specified item for each user; a calculation unit operable to calculate the predicted preference value for the specified item when the preference value of a user for the specified item is not stored in the first storage unit, the predicted preference value being calculated on the basis of the preference values of at least two users for the specified item stored in the first storage unit and the reservation information for the at least two users for the specified item stored in the second storage unit; and a third transmission unit operable to transmit to the user the predicted preference value for the specified item calculated by the calculation unit.

The specified item may be information, a commodity, a service, content or a broadcast program.

In the information processing system of the invention, and in the information output apparatus, the designation of an item is received from the user; the preference value of the user for the item is acquired; the identification information for identifying the item and the preference value of the user for the item are transmitted to the information processing apparatus through the network; when the designation of the item is a designation of a reservation of the item, the reservation information for the item and the identification information for the item are transmitted to the information processing apparatus through the network; a recommended item to be presented to the user is prepared on the basis of the predicted preference value transmitted from the information processing apparatus when the preference value of the user for the item is not acquired; and the recommended item is presented to the user.

In the information processing apparatus, the identification information for the item transmitted from the information output apparatus and the preference value are stored for each user; the reservation information for the item transmitted from the information output apparatus and the corresponding identification information for the item are stored for each user; the predicted preference value for the item is calculated for a user when the preference value for the user is not stored, the predicted preference value being calculated on the basis of the stored preference values of at least two users for the item and the stored reservation information for the at least two users for the item; and the calculated predicted preference value is transmitted to the user.

An information output apparatus includes a first reception unit operable to receive designations of items from users; a first acquisition unit operable to acquire preference values of the users for each item; a first transmission unit operable to transmit identification information for identifying the items and the preference values of the users for the items to an information processing apparatus through a network; a second transmission unit operable to transmit reservation information for an item and the identification information for the item to the information processing apparatus through the network when the designations of the item are designations of reservations of the item; a preparation unit operable to prepare a recommended item to be presented to a user on the basis of a predicted preference value transmitted from the information processing apparatus when the first acquisition unit does not acquire the preference value of the user for the item; and a presentation unit operable to present to the user the recommended item prepared by the preparation unit.

A receiving unit operable to receive a list of items from the information processing apparatus, and a display unit operable to display the list of items are further provided; and the first reception unit may receive the designations of the items from the users from among the list of items displayed by the display unit.

The items may be information, a commodity, a service, or content. The items also may be broadcast programs.

A viewing unit operable to view the broadcast programs, a recording unit operable to record the broadcast programs, and a reproduction unit operable to reproduce the broadcast programs may be further provided.

The information output apparatus may further include a second acquisition unit operable to acquire information concerning a broadcasting time of a broadcast program; a first calculation unit operable to calculate an accumulated viewing time during which the broadcast program is viewed by the viewing unit; a second calculation unit operable to calculate a recording time during which the broadcast program is recorded by the recording unit; a third calculation unit operable to calculate a reproduction time during which the broadcast program is reproduced by the reproduction unit; a fourth calculation unit operable to calculate the preference value by dividing the accumulated viewing time by the broadcasting time of the broadcast program; and a fifth calculation unit operable to calculate the preference value by dividing the reproduction time by the recording time.

The information output apparatus may further include a second reception unit operable to receive an input of the preference values from the users; and a determination unit operable to determine whether the input of the preference values has been received by the second reception unit; and the first acquisition unit may acquire a preference value input to the second reception unit when the determination unit determines that the input of the preference value has been received by the second reception unit, and may acquire the preference value calculated by the fourth calculation unit or the fifth calculation unit when the determination unit determines that the input of the performance value has not been received by the second reception unit.

The designation of the reservation may include a purchase reservation of information, service or content, a view reservation of a broadcast program, or a recording reservation of a broadcast program.

The first transmission unit may be operable to transmit information concerning the users together with the preference values. The information concerning the users may include at least one of plural pieces of information concerning an age, a gender, an address, a use language, and a taste.

An information output method of the invention includes receiving designations of items from users; acquiring a preference value of each user for a specified one of the items; transmitting identification information for identifying the specified item and the preference values of the users for the specified item to an information processing apparatus through a network; transmitting reservation information for the specified item and the identification information for the specified item to the information processing apparatus through the network when the designations of the specified item are designations of reservations of the specified item; preparing a recommended item to be presented to a user on the basis of a predicted preference value transmitted from the information processing apparatus when the preference value of the user for the specified item is not acquired in the acquisition step; and presenting to the user the recommended item prepared in the preparation step.

A recording medium of the invention is recorded with a computer-readable program for processing information, the program including receiving designations of items from users; acquiring preference values of the users for a specified one of the items; transmitting identification information for identifying the specified item and the preference values of the users for the specified item to an information processing apparatus through a network; transmitting reservation information for the specified item and the identification information for the specified item to the information processing apparatus through the network when the designations of the specified item are designations of reservations of the specified item; preparing a recommended item to be presented to a user on the basis of a predicted preference value transmitted from the information processing apparatus when the preference value of the user for the specified item is not acquired in the acquisition step; and presenting to the user the recommended item prepared in the preparation step.

An information processing system of the invention includes a processor operable to execute instructions; and instructions, the instructions including receiving designations of items from users; acquiring preference values of the users for a specified one of the items; transmitting identification information for identifying the specified item and the preference values of the users for the specified item to an information processing apparatus through a network; transmitting reservation information for the specified item and the identification information for the specified item to the information processing apparatus through the network when the designations of the specified item are designations of reservations of the specified item; preparing a recommended item to be presented to a user on the basis of a predicted preference value transmitted from the information processing apparatus when the preference value of the user for the specified item is not acquired in the acquisition step; and presenting to the user the recommended item prepared in the preparation step.

In the information output apparatus and method of the invention, the recording medium, and the information processing system, designations of items are received from users; preference values of the users for a specified one of the received items are acquired; identification information for identifying the specified item and the acquired preference values are transmitted to an information processing apparatus through a network; the reservation information for the specified item and the corresponding identification information for the specified item are transmitted to the information processing apparatus through the network when the designations of the specified item are designations of reservations of the specified item; a recommended item to be presented to a user is prepared on the basis of the predicted preference value transmitted from the information processing apparatus when the preference value of the user for the specified item is not acquired; and the recommended item is presented to the user.

An information processing apparatus of the invention includes a first storage unit operable to store for each user identification information for an item transmitted from an information output apparatus and a corresponding preference value for the item; a second storage unit operable to store for each user reservation information for the item transmitted from the information output apparatus and corresponding identification information for the item; a calculation unit operable to calculate a predicted preference value for the item when the preference value of a user for the item is not stored in the first storage unit, the predicated preference value being calculated on the basis of the preference values of at least two users for the item stored in the first storage unit and the reservation information for the at least two users for the item stored in the second storage unit; and a first transmission unit operable to transmit to the user the predicted preference value for the item calculated by the calculation unit.

In the calculation unit, correlations between one user and plural users other than the one user are obtained on the basis of the preference values of the plural users for one or more items; digitized values are weighted on the basis of the existence of reservations of the plural users for the one item according to heights of the correlations between the one user and the plural users; these are added together for the plural users; and the predicted preference value of the one user for the item is calculated when the preference value of the one user for the item is not stored in the first storage unit.

A third storage unit operable to store a list of items to be displayed by the information output apparatus, and a second transmission unit operable to transmit the list of items stored in the third storage unit to the information output apparatus may be further provided.

The item may be a broadcast program.

The item may be information, a commodity, a service, or content.

An information processing method of the invention includes storing for each user identification information for an item transmitted from an information output apparatus and a preference value for the item; storing for each user reservation information for an item transmitted from the information output apparatus and corresponding identification information for the item; calculating a predicted preference value for the item when the preference value of a user for the item is not stored in the first storage step, the predicted preference value being calculated on the basis of the preference values of at least two users for the item stored in the first storage step and the reservation information for the at least two users for the item stored in the second storage step; and transmitting to the user the predicted preference value for the item calculated by the calculation step.

A second recording medium of the invention is recorded with a computer-readable program for processing information, the program including controlling for each user the storage of identification information for an item transmitted from an information output apparatus and a preference value for the item; controlling for each user the storage of reservation information for an item transmitted from the information output apparatus and corresponding identification information for the item; calculating a predicted preference value for the item when the preference value of a user for the item is not stored in the first storage control step, the predicted preference value being calculated on the basis of the preference values of at least two users for the item stored in the first storage control step and the reservation information for the at least two users for the item stored in the second storage control step; and transmitting to the user the predicted preference value for the item calculated by the calculation step.

A second information processing system of the invention includes a processor operable to execute instructions; and instructions, the instructions including controlling for each user the storage of identification information for an item transmitted from an information output apparatus and a preference value for the item; controlling for each user the storage of reservation information for an item transmitted from the information output apparatus and corresponding identification information for the item; calculating a predicted preference value for the item when the preference value of a user for the item is not stored in the first storage control step, the predicted preference value being calculated on the basis of the preference values of at least two users for the item stored in the first storage control step and the reservation information of the at least two users for the item stored in the second storage control step; and transmitting to the user the predicted preference value for the item calculated by the calculation step.

In the information processing apparatus and method of the invention, the recording medium, and the information processing system, identification information for an item transmitted from an information output apparatus and a preference value for the item are stored for each user; reservation information for the item transmitted from the information output apparatus and the corresponding identification information for the item are stored for each user; a predicted preference value for the item is calculated when the preference value of a user for the item is not stored, the predicted preference value being calculated on the basis of the stored preference values of at least two users and the stored reservation information of the at least two users; and the calculated predicted preference value for the item is transmitted to the user.

BRIEF DESCRIPTION OF THE DRAWINGS

FIG. 6 is a view showing an example of data recorded in a user preference database.

FIG. 8 is a view showing an example of data recorded in a user profile database.

FIG. 9 is a view showing another example of data recorded in the user profile database.

FIG. 11 is a block diagram showing a structural example of a general-purpose personal computer made to have the functions of the server of the invention or the recommendation apparatus.

DETAILED DESCRIPTION

Figure 1:
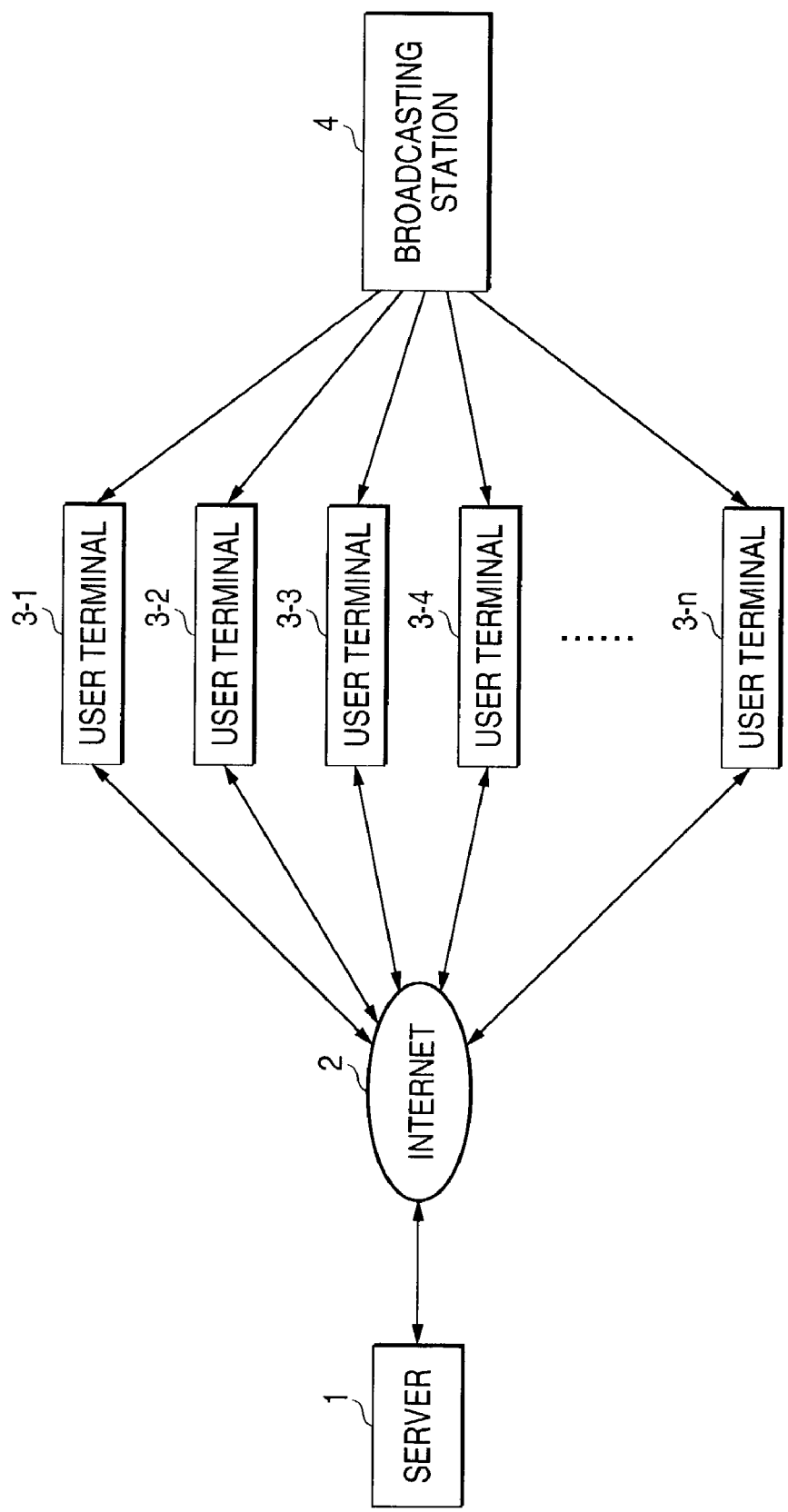
FIG. 1 is a block diagram showing a structural example of an information processing system of the invention.

A structural example of an information processing system in a case where the present invention is applied to television broadcasting will be described with reference to FIG. 1. A server 1 transmits an electronic program guide through an internet 2 to user terminals 3-1 to 3-n, and records degree of preference data as an index of the taste of a user for a program supplied from user terminals 3-1 to 3-n. Besides, on the basis of the recorded degree of preference data, the server 1 calculates a predicted value of the degree of preference (hereinafter referred to as a degree of preference predicted value) of each user for a program scheduled to be broadcast, and transmits it to the corresponding user terminal 3-i (i=1, 2, . . . , n).

The user terminals 3-1 to 3-n present the electronic program guide supplied from the server 1 through the internet 2 (or television broadcasting electric wave) to users, and urge the users to select, from that, programs to be viewed or programs to be recorded. When receiving the selection of programs from the users, the user terminals 3-1 to 3-n perform corresponding processing, calculate degree of preference data, and supply them to the server 1 (details of the processing will be described later). Besides, the user terminals 3-1 to 3-n prepare lists of programs, the viewing or recording of which is recommended to the users, on the basis of the degree of preference predicted values supplied from the server 1, and present them to the users.

The broadcasting station 4 transmits programs to the user terminals 3-1 to 3-n through television broadcasting electric waves.

Incidentally, in the following description, in the case where it is not necessary to individually distinguish the user terminals 3-1 to 3-n, they are collectively called the user terminal 3.

Figure 2:
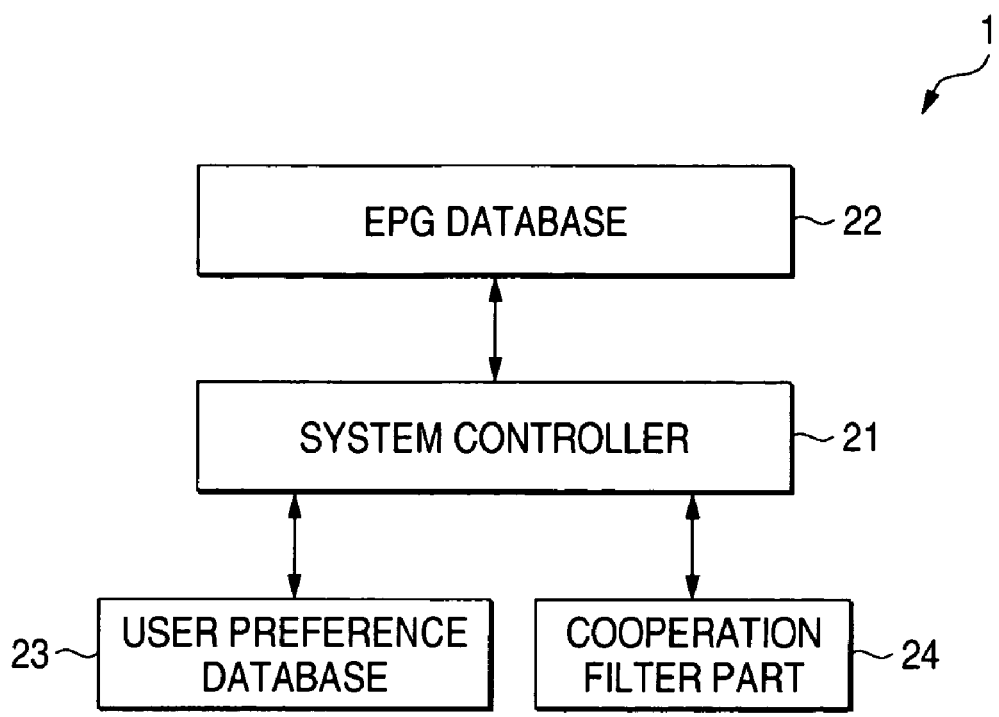
FIG. 2 is a block diagram showing a structural example of a server.

Next, a structural example of the server 1 will be described with reference to FIG. 2. A system controller 21 controls respective parts of the server 1 and causes them to execute various processes. Besides, the system controller 21 communicates with the user terminal 3 through the internet 2, supplies information to the respective parts in the server 1, and reads out information from the respective parts.

An EPG (Electronic Program Guide) database 22 stores an electronic program guide as a broadcasting schedule table of television programs on the air at present or scheduled to be broadcast in the future, and suitably supplies it to the user terminal 3 from the system controller 21. Incidentally, the electronic program guide includes the title of each program, a broadcast day, a broadcast start time, a broadcast end time, a broadcasting station 4, program identification information for identifying the program, and a brief explanatory note of the contents of the broadcast program.

A user preference database 23 arranges and records, for respective users, degree of preference data of the respective users for programs received from the user terminal 3 through the system controller 21 and program identification information of reservation programs. Besides, the user preference database 23 suitably supplies the stored data to a cooperation filter part 24 through the system controller 21.

When the data is supplied from the user preference database 23, on the basis of that, the cooperation filter part 24 calculates degree of preference predicted values of the respective users for programs scheduled to be broadcast in the future, and supplies them to the system controller 21.

Figure 3:
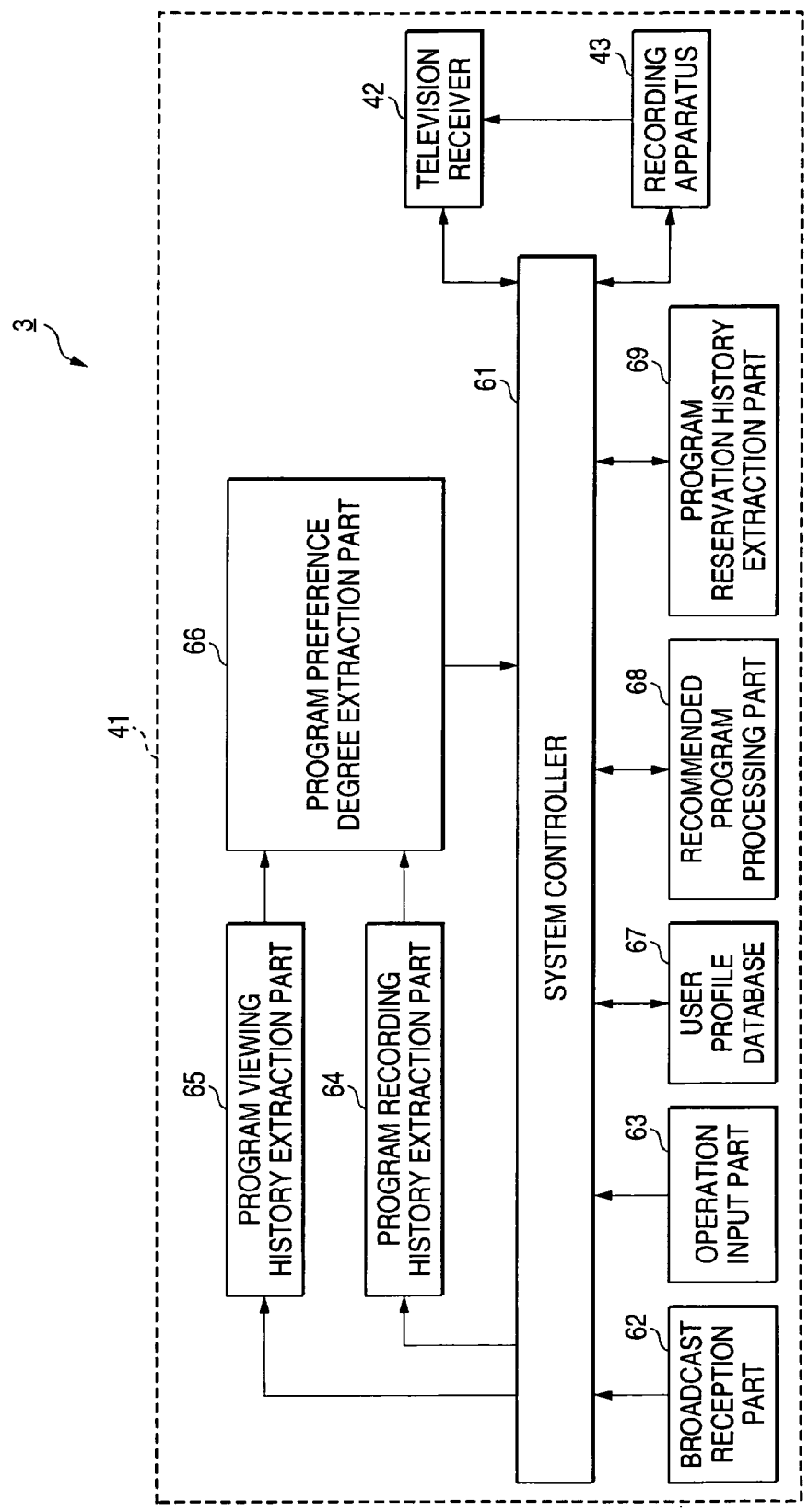
FIG. 3 is a block diagram showing a structural example of a user terminal.

Next, a structural example of the user terminal 3 will be described with reference to FIG. 3. The user terminal 3 is constituted by a recommendation apparatus 41, a television receiver 42, and a recording apparatus 43.

A system controller 61 of the recommendation apparatus 41 controls respective parts of the recommendation apparatus 41 by a previously set program or an input from an operation input part 63, and causes them to execute various processes. The system controller 61 also transmits various pieces of information to and receives various pieces of information from the server 1 through the internet 2, temporarily stores the acquired information, supplies it to the respective parts, and controls the delivery of information between the respective parts in the recommendation apparatus 41. In addition, the system controller 61 is connected to the television receiver 42 and the recording apparatus 43, and performs input/output of information.

A broadcast reception part 62 receives an electronic program guide supplied from the broadcast station 4, and supplies it to the system controller 61. The operation input part 63 is constructed as plural buttons set in a main body of the recommendation apparatus 41 or as a remote controller separate from the main body of the recommendation apparatus 41. The operation input part 63 receives input from a user of various operations, such as an instruction to record a program, a reproduction instruction, an instruction to reserve a program, an instruction to view a program, or an input of a degree of preference for a program, and supplies it to the system controller 61.

A program recording history extraction part 64 acquires, through the system controller 61, program identification information and a recording time of a program input from the operation input part 63 and receives an instruction for recording, and supplies the program identification information and the information concerning the recording time to a program preference degree extraction part 66.

A program viewing history extraction part 65 acquires, through the system controller 61, program identification information of a program input from the operation input part 63 and receives an instruction of viewing by the television receiver 42 and information concerning its viewing time, and supplies them to the program preference degree extraction part 66. In addition, when an instruction to reproduce a recorded program is input from the operation input part 63, the program viewing history extraction part 65 counts the time until an instruction to stop the reproduction is input from the operation input part 63 (or the time until the reproduction of the program has ended), and supplies information concerning the reproduction time of the program to the program preference degree extraction part 66. However, the program viewing history extraction part 65 does not count the time of fast-forward, rewinding, or pause in the reproduction.

The program degree of preference extraction part 66 calculates a degree of preference on the basis of the program identification information and the viewing time of the program viewed by the television receiver 42, as input from the program viewing history extraction part 65. In addition, the program preference degree extraction part 66 calculates a degree of preference on the basis of the recording time of the program recorded by the recording apparatus 43 and input from the program recording history extraction part 64, and the reproduction time of the recorded program input from the program viewing history extraction part 65. The program degree of preference extraction part 66 causes a user profile database 67 to store the degree of preference for each program calculated in this way through the system controller 61.

The user profile database 67 records information concerning a user, such as a user name of the user possessing the user terminal 3, a user ID at access to the server 1, the user's birth date, and gender. In addition, the user profile database 67 makes the program identification information supplied from the program degree of preference extraction part 66 correspond to the degree of preference and records them. However, in the case where a degree of preference for a program viewed by the television receiver 42 is input from the operation input part 63, the user profile database 67 records the degree of preference input from the operation input part 63 with priority. In addition, the user profile database 67 records program identification information of a reservation program supplied from a program reservation history extraction part 69. The user profile database 67 transmits the program identification information recorded in this way and the corresponding degree of preference information, or the program identification information of the reservation program to the server 1 through the system controller 61.

A recommended program processing part 68 receives input of the electronic program guide and degree of preference predicted values corresponding to broadcast scheduled programs from the server 1, carries out an operation for a list of programs to be recommended to a user on the basis of this, and supplies it to the television receiver 42 through the system controller 61.

When an instruction to reserve a broadcast scheduled program is input from the operation input part 63, the program reservation history extraction part 69 acquires program identification information of the broadcast scheduled program through the system controller 61, and causes the user profile database 67 to record it.

In accordance with an instruction to select a viewing program input from the operation input part 63, the television receiver 42 selects a predetermined channel at a predetermined time, and displays the program. In addition, the television receiver 42 displays a reproduction program supplied from the recording apparatus 43. The television receiver 42 also displays the electronic program guide supplied from the broadcast reception part 62 through the system controller 61. Further, while the degree of preference is input by the operation of the operation input part 63, the television receiver 42 displays the degree of preference under setting. Additionally, the television receiver 42 displays the list of recommended programs supplied from the recommended program processing part 68.

The recording apparatus 43 is, for example, a video tape recorder or a DVD (Digital Versatile Disc) recorder, and records a program in accordance with the recording instruction input from the operation input part 63. The recording apparatus 43 reproduces the recorded program in accordance with the instruction to reproduce the recorded program, and supplies reproduction signals to the television receiver 42.

Incidentally, in the foregoing structural example, although the recommendation apparatus 41, the television receiver 42, and the recording apparatus 43 are separate apparatuses, the recommendation apparatus 41 and the television receiver 42 can be made to have an integral structure. Also, the television receiver 42 and the recording apparatus 43 can be made to have an integral structure, or the recommendation apparatus 41, the television receiver 42, and the recording apparatus 43 can be made to have an integral structure.

Figure 4:
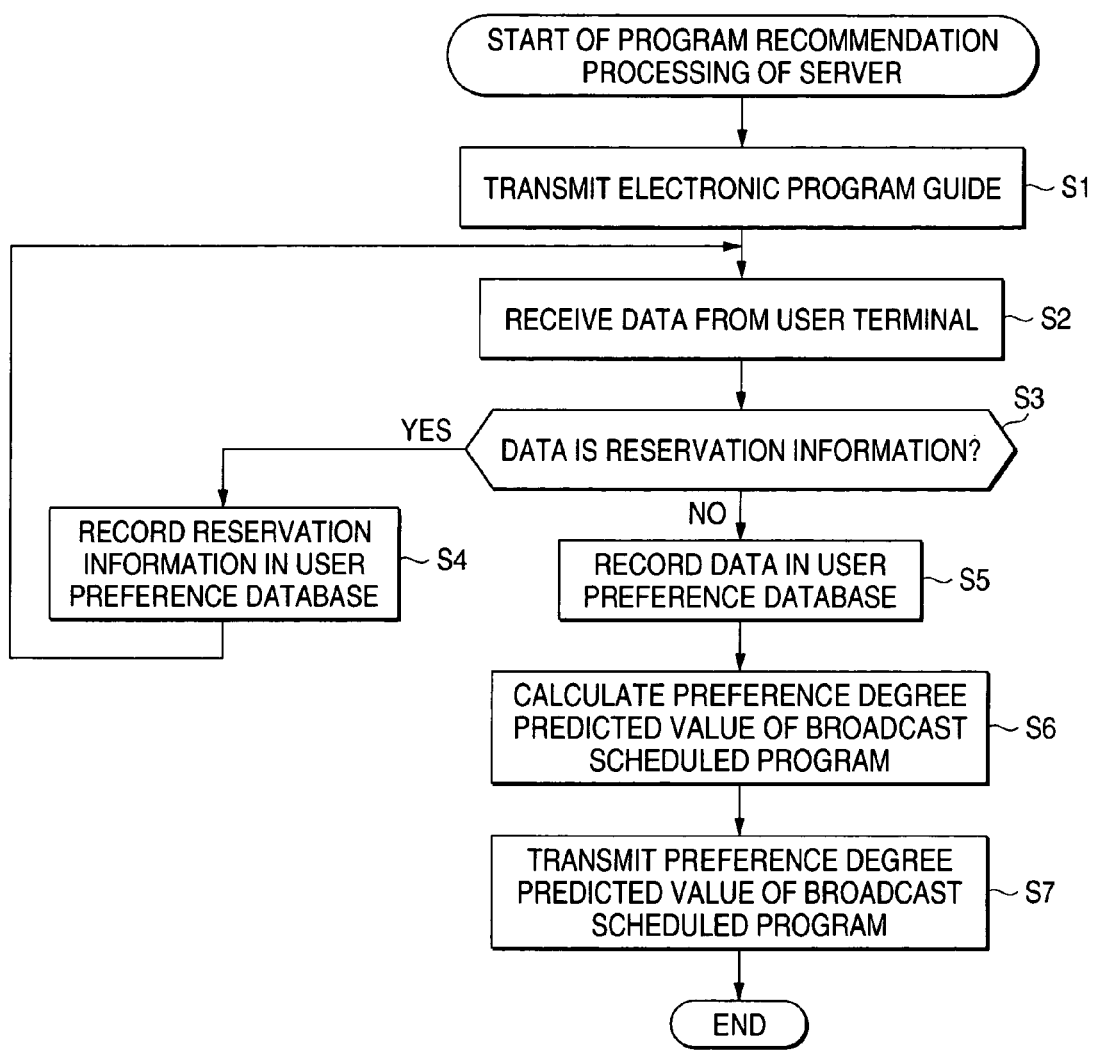
FIG. 4 is a flowchart for explaining program recommendation processing of the server.
Figure 5:
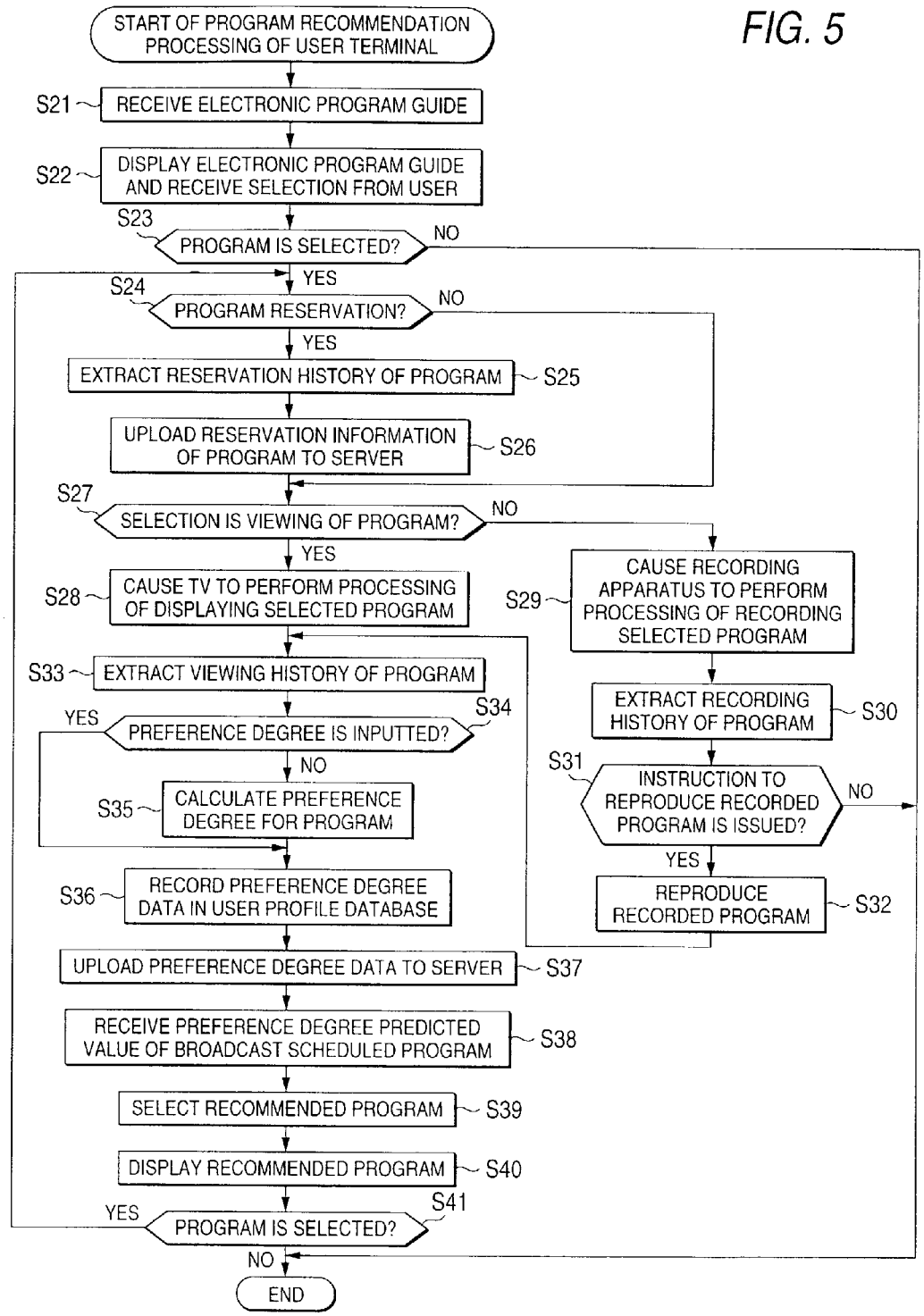
FIG. 5 is a flowchart for explaining program recommendation processing of the user terminal.

Next, a process of recommending a broadcast scheduled program to a user will be described with reference to the flowcharts of FIG. 4 and FIG. 5. Incidentally, the flowchart of FIG. 4 shows the processing of the server 1, and the flowchart of FIG. 5 shows the processing of the user terminal 3.

When a request for transmission of the electronic program guide is made from the user terminal 3, or when a previously set predetermined transmission time arrives, at step S1, the system controller 21 of the server 1 reads out the electronic program guide from the EPG database 22, and transmits it to the system controller 61 of the user terminal 3 through the internet 2.

At step S21, the system controller 61 of the recommendation apparatus 41 receives and stores the electronic program guide, and causes the user profile database 67 to record program identification information of plural programs contained in the electronic program guide.

At step S22, the system controller 61 causes the television receiver 42 to display a schedule table of programs contained in the electronic program guide received at the step S21, and receives input of an instruction to view or record a program from the operation input part 63.

At step S23, the system controller 61 determines whether the selection of a program to be viewed or recorded has been input from the operation input part 63, and in the case where the selection of the program to be viewed or recorded has not been input, the processing is ended. In the case where the system controller 61 determines that the selection of a program to be viewed or recorded has been input from the operation input part 63, the processing proceeds to step S24, and the system controller 61 determines whether the instruction input from the operation input part 63 is viewing of the program or reservation of recording, and in the case where it is not the reservation of a program, step S25 and step S26 are skipped.

At the step S24, in the case where the system controller 61 determines that the input from the operation input part 63 is an instruction to reserve a program, the processing proceeds to step S25, the program reservation history extraction part 69 acquires program identification information of the program receiving the instruction of viewing or recording from the electronic program guide temporarily stored in the system controller 61, and causes a numerical value "1" meaning reservation to be recorded in a column of the corresponding program identification information of the user profile data recorded in the user profile database 67. Incidentally, "0" is recorded in a column corresponding to a program which is not reserved.

At step S26, the system controller 61 reads out the program identification information recorded at step S21 and the information of "1" or "0" indicating the existence of a reservation from the user profile database 67, and transmits the reservation information of the program to the server 1. Incidentally, the reservation information is information including program identification information, information of "1" or "0" indicating the existence of the reservation of a program, and information including a user ID.

At step S2, when it receives the data from the user terminal 3, the system controller 21 of the server 1 specifies the user from the user ID included in the reservation information, and at step S3, determines whether the data received at step S2 is reservation information. If the received data is reservation information, the processing proceeds to step S4, the identification information of the program and the information of "1" or "0" indicating the existence of a reservation are extracted from the reservation information received at step S2, and they are arranged and recorded in the user preference database 23. At that time, the user is identified based on the user ID, and they are made to correspond to the user and are recorded. FIG. 6 shows an example of information recorded in the user preference database 23, including the identification information of the reserved programs.

In the table of FIG. 6, "user ID" is written in the top left cell, and user ID "01000351", "01000352", "01000353", and "01000354" are written toward the right. "program 1", "program 2", "program 3", and "program 4" at second to fifth rows in the leftmost column are program identification information of programs which already have been broadcast. The program identification information may be recorded by using numerals of a predetermined number of digits or symbols such as an alphabet.

In the table of FIG. 6, the second row reads "program 1", "0.12", "0.97", "0.25", and "0.13" from the left, and this shows degrees of preference of respective users of user IDs "01000351", "01000352", "01000353", and "01000354". Similarly, at the third row to the fifth rows, degrees of preference of the respective users for the respective programs are shown in the second column to the fifth column. As stated above, the degrees of preference of the respective users for a predetermined number of programs which already have been broadcast are recorded in the user preference database 23.

Incidentally, in the following explanation, in FIG. 6, the user with the user ID of 01000351 is called a user 1, the user with the user ID of 01000352 is called a user 2, the user with the user ID of 01000353 is called a user 3, and the user with the user ID of 01000354 is called a user 4.

In FIG. 6, the eighth row to tenth row of the leftmost column read "reservation program 101", "reservation program 102", and "reservation program 103", respectively, and the program identification information of programs scheduled to be broadcast in the future is shown. In the second column to fifth column at the eighth row to tenth row, "0" or "1" is written, "0" indicating that the corresponding broadcast scheduled program is not reserved, and "1" indicating that it is reserved. For example, at step S2, when the reservation information to reserve "reservation program 101" is received from the user 1, at step S4, "1" is written in the cell at the eighth row and the second column. In the case of the user 1, "0" and "0" are written in the cells corresponding to "reservation program 102" and "reservation program 103", which indicates that the reservation program 102 and the reservation program 103 are not reserved.

Returning to FIG. 5, at step S27, it is determined by the system controller 61 whether the instruction input from the operation input part 63 is the viewing of a program. In the case of the viewing of the program, the processing proceeds to step S28 at which the system controller 61 causes the television receiver 42 to perform a process of displaying the selected program, and then proceeds to step S33. However, at step S24, in the case where it has been determined that the input instruction is the reservation (viewing reservation) of a program, the system controller is on standby until the broadcast time of the program, and issues an instruction to display the selected program to the television receiver 42 immediately before the broadcast time.

At step S27, in the case where it is determined that the instruction input from the operation input part 63 is not the viewing of a program (in the case where it is determined to be the recording of a program), the processing proceeds to step S29, and the system controller 61 causes the recording apparatus 43 to perform a process of recording the selected program. However, at step S24, in the case where it has been determined that the input instruction is the reservation of a program (recording reservation), the system controller causes the recording apparatus 43 to perform the recording reservation of the selected program.

At step S30, the program recording history extraction part 64 extracts the program identification information of the program corresponding to the recording instruction input from the operation input part 63 and the recording time from the electronic program guide temporarily stored in the system controller 61.

At step S31, when an instruction to reproduce the program recorded at step S29 is input to the recording apparatus 43 from the operation input part 63, the processing proceeds to step S32, and the program recorded by the recording apparatus 43 is reproduced and is viewed through the television receiver 42, and then, the processing proceeds to step S33.

At step S31, in the case where a reproduction instruction is not input to the recording apparatus 43, and a recording medium on which the program is recorded is pulled out from the recording apparatus 43, or the recorded program is erased, the processing is ended.

At step S28, there is a case where a program viewed through the television receiver 42 is switched to another program halfway by input from the operation input part 63. Then, at step S33, by the instruction of the system controller 61, the program viewing history extraction part 65 calculates an accumulated viewing time of each of one or more programs viewed through the television receiver 42 at step S28, makes it correspond to the program identification information, and stores it. At this time, information concerning the broadcast time (a time from a broadcast start time to a broadcast end time) of the program corresponding to the program identification information is extracted from the program guide stored in the system controller 61, is made to correspond to the program identification information of each program viewed, and is stored.

In addition, in the case where an adjacent processing is step S32, that is, reproduction of a recorded program, at step S33, when the instruction to reproduce the recorded program is input from the operation input part 63, the program viewing history extraction part 65 counts the reproduction time until an instruction to stop the reproduction is input from the operation input part 63 (or the time until the reproduction of the program has ended). However, in the case where fast-forward, rewinding or the like is performed during the reproduction, the time required for those operations is not counted, but only an accumulated reproduction time is calculated. The program viewing history extraction part 65 calculates the accumulated reproduction time of the program for each of one or more programs recorded, causes it to correspond to the program identification information, and stores it.

At step S34, the system controller 61 determines whether a degree of preference has been input from the operation input part 63.

Figure 7:
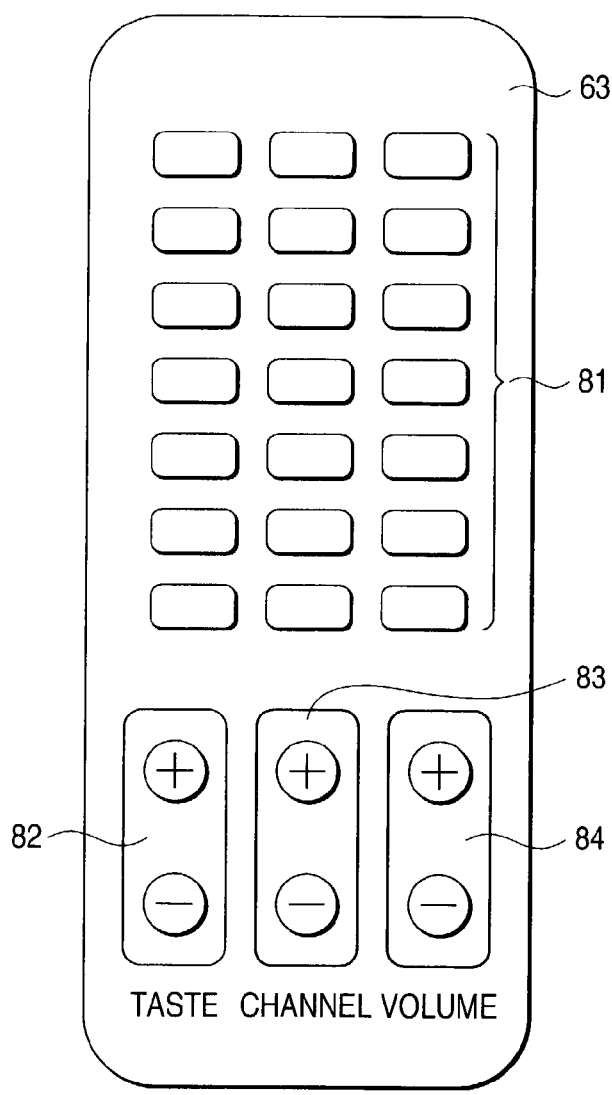
FIG. 7 is a view showing an example of an operation input part of a recommendation apparatus.

Although a degree of preference for a program can be automatically calculated by the program degree of preference extraction part 66, a user can manually set it by an input from the operation part 63. FIG. 7 is an example of the operation input part 63 used when the user manually inputs the degree of preference.

In FIG. 7, the operation input part 63 is constructed as a remote controller, and various operation buttons 81 for giving instructions of various processes to be performed by the recommendation apparatus 41, such as an instruction to view a program, a recording instruction, a reproduction instruction, a reservation instruction, and an electronic program guide display instruction, are arranged. When the "+" side of a channel selection button 83 is pressed, the recommendation apparatus 41 selects a channel higher in number by one than the presently selected channel. On the other hand, when the "−" side is pressed, a program lower in number by one than the presently selected channel is selected. When the "+" side of a volume button 84 is pressed, the television receiver 42 turns up the volume of the program being viewed, and on the other hand, when the "−" side is pressed, it turns down the volume of the program being viewed.

A degree of preference setting button 82 is used when a user manually sets a degree of preference of the program being viewed. The user can estimate the program with estimation set values of ten stages from −5 to +5 by operating the degree of preference setting button 82, and at step S28 or step S32, when the "+" side or the "−" side of the degree of preference setting button 82 is first pressed by the user during the viewing of a specified program, a default estimation set value "0" is displayed at the end of the screen of the television receiver 42 by which the program is being viewed. In the case where the user takes an interest in the program being viewed, a higher estimation can be set to the program by pressing the "+" side of the degree of preference setting button 82. On the other hand, in the case where the user does not take an interest in the program being viewed, a low estimation can be set to the program by pressing the "−" side.

The estimation set value of the program is incremented by one each time the "+" side of the degree of preference setting button 82 is pressed, and the display on the screen of the television receiver 42 is also correspondingly changed in the order of "1", "2", "3", "4", and "5".

On the other hand, the estimation set value of the program is decremented by one each time the "−" side of the degree of preference setting button 82 is pressed, and the display on the screen of the television receiver 42 is also correspondingly changed in the order of "−1", "−2", "−3", "−4", and "−5". The user selectively uses the "+" side and the "−" side of the degree of preference setting button 82 and can set the degree of preference to a desirable value. Incidentally, of course, it is also possible to lower an excessively incremented degree of preference by pressing the "−" side, or contrary, it is also possible to raise an excessively lowered degree of preference by pressing the "+" side.

However, the degree of preference is set in the range of −1.0 to 1.0. The system controller 61 multiplies the estimation set value for the program, which is set in the manner described above, by ⅕ to calculate the degree of preference in the range of −1.0 to 1.0. from the estimation set value set in the range of −5 to +5.

As described above, in the case where the estimation set value is manually input from the user at step S34, the system controller 61 determines that the degree of preference has been input from the operation input part 63, the processing of step S35 is skipped, and the processing of step S36 is performed.

In the case where the degree of preference is not manually input from the user at step S34, the system controller 61 determines that the degree of preference has not been input from the operation input part 63, and the processing of step S35 is performed.

At step S35, by an instruction from the system controller 61, the program degree of preference extraction part 66 calculates the degree of preference for each of one or more programs displayed by the television receiver 42 through a predetermined calculation described below.

In the case where the program displayed by the television receiver 42 is not one recorded in the recording apparatus 43 (in the case where it is a program being viewed at step S28), the program degree of preference extraction part 66 reads out the accumulated viewing time of each program stored by the program viewing history extraction part 65 at step S33 and the corresponding broadcast time of the program, and calculates the degree of preference for the program from the accumulated viewing time and the broadcast time by the following expression.

degree of preference=accumulated viewing time/ broadcast time

For example, in the case where a program broadcast for one hour is viewed for 30 minutes, the calculated degree of preference is 0.5. Incidentally, in this case, the degree of preference is calculated as a value in the range of 0.0 to 1.0.

In the case where the program being viewed by the television receiver 42 is one recorded in the recording apparatus 43 (in the case where it is a program reproduced at step S32), the program degree of preference extraction part 66 reads out the recording time of the recorded program acquired by the program recording history extraction part 64 at step S30 and the accumulated reproduction time of the recorded program calculated by the program viewing history extraction part 65 at step S33. Then, from the accumulated reproduction time and the recording time of the program, the degree of preference for the program is calculated through the following expression.

degree of preference=accumulated reproduction time/ recording time

For example, in the case where a program recorded for one hour is viewed for 30 minutes, the calculated degree of preference is 0.5. Incidentally, also in this case, the degree of preference is calculated as a value in the range of 0.0 to 1.0.

By the calculation described above, the degree of preference is calculated in the program degree of preference extraction part 66 for each of one or more programs that are viewed.

At step S36, the system controller 61 reads out the degree of preference data calculated at step S35 for each program from the program degree of preference extraction part 66, supplies it to the user profile database 67, and causes it to be recorded.

However, at step S34, in the case where it is determined that the degree of preference is manually set by the user, the system controller 61 supplies the degree of preference set by the user to the user profile database 67 and causes it to be recorded.

FIG. 8 and FIG. 9 show examples of data recorded in the user profile database 67. In FIG. 8, personal information of each user receiving this service is recorded.

In the table of FIG. 8, in the left column, various items of "user ID", "user name", "birth date", and "gender" are written from the second row. In the right column, corresponding attributes are written from the second row. That is, it is indicated that "user ID" is "01000351", "user name" is "Taro Suzuki", "birth date" is "Jan. 1, 1970", and "gender" is "male".

The user profile database 67 records a table of personal information of a user as shown in FIG. 8 for each user.

In addition, the user profile database 67 records the degree of preference data supplied at step S36, such as in the table shown in FIG. 9.

The table of FIG. 9 shows degree of preference data of one user recorded in the user profile database 67. In the table of FIG. 9, "program 1", "program 2", "program 3", and "program 4" at the second row to the fifth row of the left column are program identification information of already broadcast programs. In the table of FIG. 9, degrees of preference corresponding to the respective programs are written at the second row to the fifth row of the right column. That is, in FIG. 9, the degree of preference for "program 1" is 0.12, the degree of preference for "program 2" is 0.54, the degree of preference for "program 3" is 0.43, and the degree of preference for "program 4" is 0.01.

In addition, in the table of FIG. 9, program identification information "reservation program 101", "reservation program 102", and "reservation program 103" of programs scheduled to be broadcast in the future are recorded at the eighth row to the tenth row of the left column, and "1" indicating that the program is reserved or "0" indicating that the program is not reserved is recorded in the corresponding cell of the right column.

At step S37, the system controller 61 reads out the degree of preference data corresponding to the program identification information from the user profile database 67 at a previously set predetermined time, and transmits them to the server 1. Incidentally, at this time, the user ID is attached to the transmitted information.

Then, the system controller 21 of the server 1 receives the degree of preference data at step S2. If it is determined at step S3 that the data is not reservation information (it is degree of preference data), the processing proceeds to step S5, and the received degree of preference data is recorded in the user preference database. For example, in the case where the degree of preference data as shown in FIG. 9 is for the user 1 of FIG. 6, the data transmitted from the system controller 61 of the recommendation apparatus 41 is recorded in the data of the user 1 in the second column from the left of FIG. 6. That is, "0.12", "0.54", "−0.43", and "0.01" from the top in the right column in FIG. 9 are respectively recorded at positions in the second column of FIG. 6 corresponding to the programs.

At step S6, the cooperation filter part 24 acquires the degree of preference data of plural users from the user preference database 23, and acquires the electronic program guide of programs scheduled to be broadcast in the future from the EPG database 22. Then, a predetermined calculation is made based on that information, and a degree of preference predicted value as a value predicting the degree of interest of each user is calculated for a program scheduled to be broadcast in the future.

The calculation principle of the degree of preference predicted value will be now described. First, the cooperation filter part 24 acquires the user preference data as shown in FIG. 6 from the user preference database 23. In FIG. 6, for example, it is assumed that the list of programs already broadcast includes program 1 to program 4, the list of programs scheduled to be broadcast in the future includes reservation program 101 to reservation program 103, and the registered users are user 1 to user 4.

When acquiring the user preference data, next, the cooperation filter part 24 obtains correlation coefficients of degrees of preference between the respective users for the already broadcast programs from the following mathematical expression 1.

$$\rho(x, y) = \frac{\sum_{j=1}^{n}(X_{-j} - X_{-ave})(Y_{-j} - Y_{-ave})}{\sqrt{\sum_{j=1}^{n}(X_{-j} - X_{-ave})^2}\sqrt{\sum_{j=1}^{n}(Y_{-j} - Y_{-ave})^2}} \quad (1)$$

In the mathematical expression, $X_{-j}$ indicates a degree of preference of a user X (a user among user 1 to user 4) for a program j (a program among program 1 to program 4, and reservation program 101 to reservation program 103). $Y_{-j}$ indicates a degree of preference of a user Y (a user other than the user X among user 1 to user 4) for the program j.

$X_{-ave}$ and $Y_{-ave}$ are, respectively, average values of degrees of preference of the user X and the user Y for the respective programs (program 1 to program 4, and reservation program 101 to reservation program 103). $\rho(x, y)$ indicates the correlation coefficient of the degrees of preference for the program between the user X and the user Y. n indicates the total number of programs (n=7 in the case of the example of FIG. 6).

According to mathematical expression 1, for example, a correlation coefficient $\rho(1, 2)$ between the user 1 and the user 2 is obtained. Similarly, correlation coefficients $\rho(1, 3)$, $\rho(1, 4)$, $\rho(2, 3)$, $\rho(2, 4)$ and $\rho(3, 4)$ are respectively obtained between the user 1 and the user 3, the user 1 and the user 4, the user 2 and the user 3, the user 2 and the user 4, and the user 3 and the user 4.

Next, the cooperation filter part 24 uses the correlation coefficients calculated using mathematical expression 1 to obtain degree of preference predicted values for the programs to be broadcast in the future according to the following mathematical expression 2.

$$X_{-i} = X_{-ave} + \frac{\sum_{r}(Y_{-i} - Y_{-ave}) \cdot \rho(x, y)}{\sum_{r}\rho(x, y)} \quad (2)$$

In the mathematical expression, $X_{-i}$ indicates a degree of preference predicted value of the user X to a program i (a program among reservation program 101 to reservation program 103). $Y_{-i}$ indicates a degree of preference of the user Y for the program i.

$\Sigma r$ indicates the total sum of other users in the group (in the case where user 1 is the user X, user 2 to user 4) as evaluation objects for obtaining degree of preference predicted values. That is, in the data as in FIG. 6, in the case where user 1 is the user X, for example, $\Sigma r \rho(x, y)$ means a calculation as follows:

$\Sigma r \rho(x, y) = \rho(1, 2) + \rho(1, 3) + \rho(1, 4)$ $X_{-ave}$ and $Y_{-ave}$ are the same as $X_{-ave}$ and $Y_{-ave}$ indicated in mathematical expression 1.

By using mathematical expression 2, the degree of preference predicted value of the user X for program 1 can be obtained.

As described above, first, the correlations of the degrees of preference between the users are calculated by mathematical expression 1, and next, by using the information relating to the existence of reservation of users to broadcast scheduled programs, the degree of preference predicted value of the user is calculated by mathematical expression 2, so that a degree of preference predicted value of a certain user for an unreserved broadcast scheduled program can be calculated on the basis of the reservation information of the other users, and an unbroadcast program can be recommended to the user.

Incidentally, broadcast scheduled programs include programs broadcast periodically, for example, every day or every week, programs broadcast in series, and other unbroadcast programs.

This operation is carried out for each of plural broadcast scheduled programs acquired from the EPG database 22. Incidentally, the calculated degree of preference predicted value is made to correspond to the program identification information of the broadcast scheduled program, and is temporarily stored in the cooperation filter part 24.

At step S7, the system controller 21 transmits the degree of preference predicted value for the broadcast scheduled program calculated at step S6 and the program identification information of the program to the system controller 61 of the recommendation apparatus 41.

At step S38, the system controller 61 of the recommendation apparatus 41 receives the degree of preference predicted value for the broadcast scheduled program, and supplies it to the recommended program processing part 68.

At step S39, the recommended program processing part 68 selects program identification information of programs to be recommended to the user on the basis of the degree of preference predicted values for the program identification information of broadcast scheduled programs received at step S38, and prepares a list of program identification information of recommended programs. Next, the recommended program processing part 68 extracts the title of the program corresponding to the selected program identification information, the broadcast date, the broadcasting station, and a brief explanatory note of broadcast contents from the electronic program guide stored in the system controller 61, and prepares a list of recommended programs to be displayed by the television receiver 42. The selection processing of programs will be described later.

At step S40, the system controller 61 acquires the list of recommended programs prepared at step S39 from the recommended program processing part 68, supplies it to the television receiver 42, and causes it to be displayed on the screen.

At step S41, the system controller 61 determines whether an instruction to select a program to be viewed or recorded from among the list of recommended programs displayed at step S40 has been input from the operation input part 63, and in the case where an instruction to select the program to be viewed or recorded has been input from the operation input 63, the processing is returned to step S24, and the above-described processing is repeated.

At step S41, in the case where it is determined that an instruction to select the program to be viewed or recorded from among the displayed list of recommended programs has not been input, the processing is ended.

The information processing apparatus of the invention performs the processing to recommend programs to the user in the manner described above. As set forth above, in the case where a user does not manually set a degree of preference, the degree of preference is automatically calculated, and therefore, the user may set the degree of preference only when he or she feels inclined to do so, and it becomes unnecessary to make such setting each time a program is viewed. Besides, by calculating the degree of preference predicted value using program reservation information as well, the degree of preference predicted value also can be calculated for an unbroadcast program, and the unbroadcast program can be added to the choices recommended to the user.

Incidentally, in this embodiment, although the process (the processing of step S6) of calculating the degree of preference predicted value of the broadcast scheduled program is performed after the degree of preference data is received from the user terminal 3, the process of calculating the degree of preference predicted value of the broadcast scheduled program may be performed after the reservation information of the program is received. Also, as described above, the process of calculating the degree of preference predicted value of the broadcast scheduled program may be performed in real time each time the degree of preference data (reservation information) of the program is received from the user terminal 3, and further, in accordance with the operation capacity of the server 1, it may be performed every several minutes or every several hours. Further, it may be performed when the server 1 has processing capacity in reserve.

In the above, although the electronic program guide is received from the server 1 at step S21, it is also possible for the broadcast reception part 62 to receive the electronic program guide supplied by television broadcasting electric waves from the broadcasting station 4 and to supply it to the system controller 61.

Although the degree of preference predicted value may be calculated for a program broadcast periodically, for example, every day or every week, or a program broadcast in series, and a program to be recommended to the user is selected on the basis of this, with respect to the program broadcast periodically in series, the program recommended to the user can be selected on the basis of already acquired degree of preference data. That is, for example, with respect to programs broadcast in series, where the input degree of preference for an already broadcasted program was high, a program in the same series scheduled to be broadcast in the future may be recommended to a user.

Figure 10:
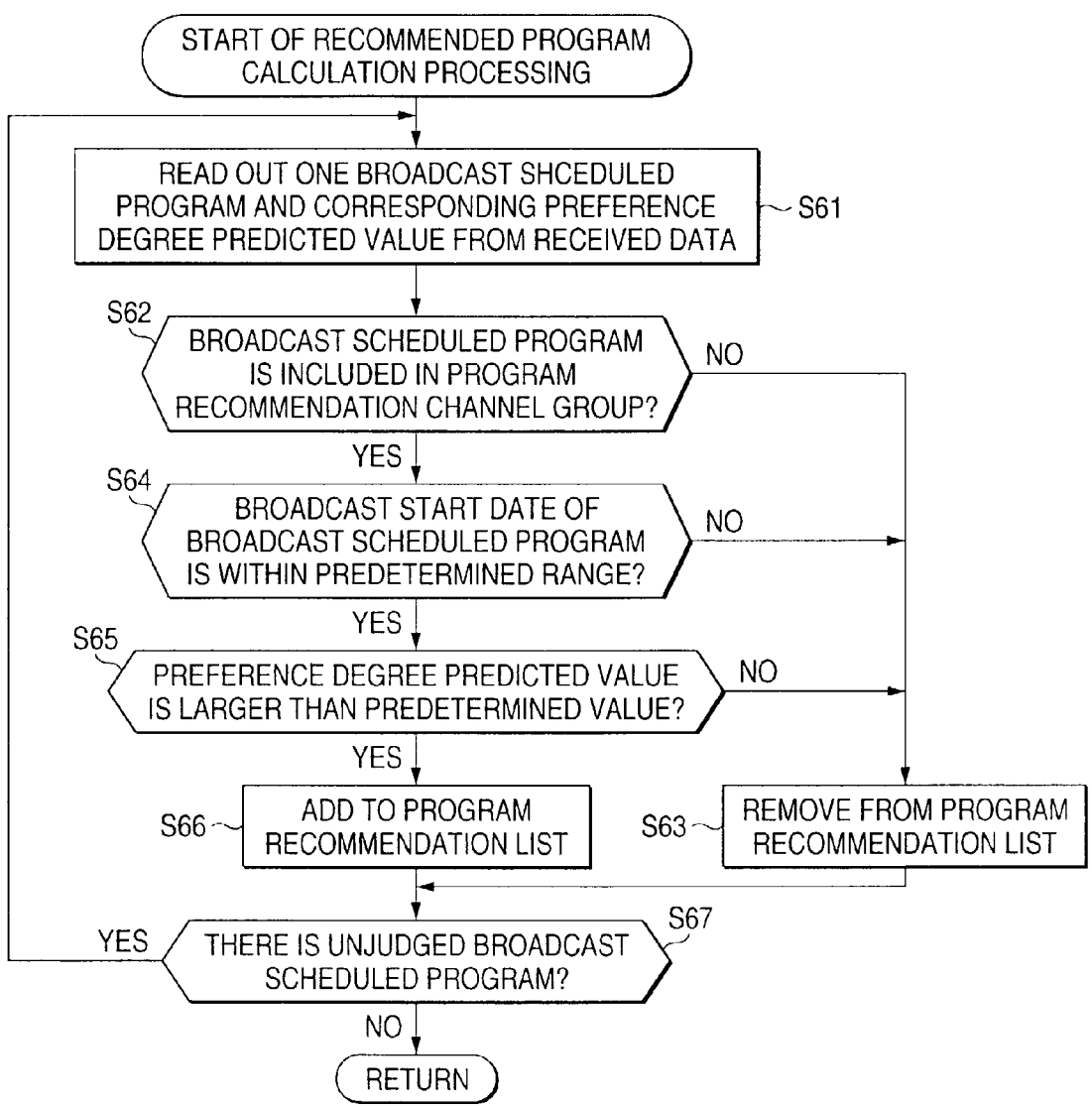
FIG. 10 is a flowchart for explaining recommended program selection processing of the recommendation apparatus of FIG. 3 in detail.

Next, the processing at step S39 of FIG. 5, that is, the process of preparing the list of programs recommended to the user on the basis of the degree of preference predicted values of broadcast scheduled programs will be described with reference to the flowchart of FIG. 10.

At step S61, the recommended program processing part 68 reads out program identification information of one broadcast scheduled program and the corresponding degree of preference predicted value from the degree of preference predicted values for one or more broadcast scheduled programs, received at step S38. Additionally, the recommended program processing part 68 extracts information concerning the title of the program, the broadcasting station to broadcast the program, and the broadcast start time from the electronic program guide stored in the system controller 61 on the basis of the read out program identification information.

In the recommendation apparatus 41, when programs to be recommended to the user are selected, only programs to be broadcast on previously set predetermined channels may be selected, and at step S62, the recommended program processing part 68 determines whether the channel of the broadcasting station 4 to broadcast the program read out at step S61 is included in the previously set channel group for recommended programs. In the case where the channel of the broadcast scheduled program is not included in the previously set channel group, the processing proceeds to step S63, the broadcast scheduled program is removed from the program list, and the processing then proceeds to step S67.

Incidentally, the setting of the channel group for recommended programs is made on the basis of an area where the user terminal 3 is set, and conditions of functions of the user terminal 3 (whether satellite broadcasts can be received, or the like). Besides, it can also be set manually according to the taste of the user.

At step S62, in the case where the recommended program processing part 68 determines that the channel of the broadcast scheduled program is included in the previously set channel group for recommended programs, the processing proceeds to step S64.

As conditions for the addition to the list of recommended programs, the range of dates when the broadcast scheduled program is to be broadcast can be specified, and the dates of the specified range are previously stored in the recommended program processing part 68. At step S64, the recommended program processing part 68 determines whether the broadcast start time of the program read out at step S61 falls within the range of the predetermined date previously stored, and in the case where it does not fall within such range, the processing proceeds to step S63, the broadcast scheduled program is removed from the program list, and the processing then proceeds to step S67.

At step S64, in the case where the recommended program processing part 68 determines that the broadcast start time of the broadcast scheduled program falls within the range of the predetermined date, the processing proceeds to step S65.

Incidentally, the previously set dates are set to a range from, for example, a start time of a program on the air to a time after 24 hours by default. However, the setting of the range of dates can also be made by the user according to his or her taste.

As conditions for addition to the list of recommended programs, a minimum value for the degree of preference predicted value is previously set in the recommended program processing part 68, and in the case where the degree of preference predicted value of the broadcast scheduled program is not less than the minimum value, it is added to the list of recommended programs. At step S65, the recommended program processing part 68 determines whether the degree of preference predicted value of the program read out at step S61 is the same as or larger than the previously set predetermined value, and in the case where it is less than the predetermined value, the processing proceeds to step S63, the broadcast scheduled program is removed from the program list, and the processing then proceeds to step S67.

At step S65, in the case where the recommended program processing part 68 determines that the degree of preference predicted value of the broadcast scheduled program is the same as or larger than the previously set value, the processing proceeds to step S66, the recommended program processing part 68 extracts the title of the program corresponding to the program identification information of the broadcast scheduled program, the broadcast date, the broadcasting station, and a brief explanatory note of the broadcast contents from the electronic program guide stored in the system controller 61, and adds the information to the list of recommended programs.

After the processing of step S63 and step S66, at step S67, the recommended program processing part 68 determines whether there is a broadcast scheduled program among the one or more broadcast scheduled programs received at step S38 on which a determination as to whether it should be added to the list of recommended programs has not been made, and in the case where it is determined that there is a program on which such determination has not been made, the process is returned to step S61, and the foregoing processing is repeated. However, a program on which a determination as to whether it should be added to the list of recommended programs has been made is not selected at step S61.

At step S67, in the case where the recommended program processing part 68 determines that there are no programs on which a determination as to whether they should be added to the list of recommended programs has not been made (a determination has been made on all broadcast scheduled programs included in the information received at step S38 as to whether they should be added to the program list), the processing is ended and proceeds to the processing of step S40.

As set forth above, the recommended program processing part 68 selects the programs to be recommended to the user on the basis of the information received at step S38, and prepares the list of recommended programs.

Incidentally, programs desired not to be recommended can be removed from the program recommendation list by previously setting them.

In addition, at step S65, although it is also possible to determine whether a program should be added to the program recommendation list on the basis of whether the degree of preference predicted value is the same as or larger than the previously set predetermined value, all broadcast scheduled programs which are determined to be included in the program recommendation channels at step S62, and the broadcast start dates of which are within the predetermined range, are arranged in descending order of degree of preference predicted value at step S64, and, for example, the top ten programs may be selected from among them and added to the program recommendation list. Although the number of recommended programs to be displayed may be set to ten by default, the user can also manually set it according to his or her taste.

Further, the recommended program list displayed on the screen of the television receiver 42 can be arranged and displayed according to several kinds of standards, such as order of time series or descending order of degree of preference predicted value, by an instruction input from the operation input part 63.

Incidentally, in this embodiment, although the recommendation of television programs has been described, what is recommended by the information processing system of the invention and the apparatus is not limited to television programs, but can also be applied to, for example, various pieces of information, services, contents, or commodities.

By the way, the server 1 and the recommendation apparatus 41 constituting the information processing system can be realized not only by hardware, but also executed by software. In this case, for example, a personal computer as shown in FIG. 11 can be used.

In FIG. 11, a CPU (Central Processing Unit) 101 executes various processes in accordance with programs stored in a ROM (Read Only Memory) 102 or programs loaded from a storage part 108 to a RAM (Random Access Memory) 103. Data necessary for the CPU 101 to execute various processes is also suitably stored in the RAM 103.

The CPU 101, the ROM 102, and the RAM 103 are mutually connected through a bus 104. An input/output interface 105 is also connected to this bus 104.

An input part 106 consisting of a keyboard, a mouse, or the like, an output part 107 consisting of a display of a CRT (Cathode Ray Tube), an LCD (Liquid Crystal Display), etc., a speaker, or the like, a storage part 108 constituted by a hard disk or the like, and a communication part 109 constituted by a modem, a terminal adapter or the like, are connected to the input/output interface 105. The communication part 109 performs communication processing through a network.

A drive 110 is also connected to the input/output interface 105 as the need arises. A magnetic disk 111, an optical disk 112, a magneto-optical disk 113, or a semiconductor memory 114 is suitably mounted on the drive 110, and a computer program read out from them is installed in the storage part 108 as the need arises.

For example, in the case where a series of processes of the server 1 are executed by software, a program constituting the software is incorporated in dedicated hardware of a computer, or is installed from a network or a recording medium in a general-purpose personal computer capable of executing various functions by installing various programs.

As shown in FIG. 11, this recording medium is not only constituted by a packaged medium separate from an apparatus body which is distributed to provide a program to a user and is formed of the magnetic disk 111 (including a floppy disk) in which the program is recorded, the optical disk 112 (including a CD-ROM (Compact Disk-Read Only Memory) or a DVD (Digital Versatile Disk)), the magneto-optical disk 113 (including an MD (Mini-Disk)), or the semiconductor memory 114, but is also constituted by the ROM 102 in which the program is recorded or the hard disk included in the storage part 108, which is provided to the user in the state where it is previously incorporated in the apparatus body.

Incidentally, in the present specification, steps describing the program recorded in the recording medium naturally include processing performed in time series in accordance with the recited sequence, and also include processing which is not necessarily executed in time series but is executed in parallel or individually.

Besides, in the present specification, the system expresses the whole apparatus constituted by plural units.

As described above, according to the information processing system of the invention, in the information output apparatus, the designation of an item is received from the user; the preference value of the user for the received item is acquired; the identification information for identifying the item and the acquired preference value corresponding to the item are transmitted to the information processing apparatus through the network; in the case where the received designation of the item is a designation of reservation of the item, the reservation information of the item and the corresponding identification information of the item are transmitted to the information processing apparatus through the network; the recommended item to be presented to the user is prepared on the basis of a predicted preference value, transmitted from the information processing apparatus, for an item the preference value of which is not acquired; and the prepared recommended item is presented to the user. In the information processing apparatus, the predicted preference value for an item the preference value of which is not stored is calculated for each user on the basis of the stored preference values of two or more users and the stored reservation information of two or more users, and the calculated predicted preference value is transmitted to the corresponding user, and therefore, it becomes possible to recommend the unestimated new item to the user.

According to the information output apparatus and the method of the invention, the recording medium, and the program, the designation of an item is received from the user; the preference value of the user for the received item is acquired; the identification information for identifying the item and the acquired preference value corresponding to the item are transmitted to the information processing apparatus through the network; in the case where the designation of the received item is a designation of reservation of the item, the reservation information of the item and the corresponding identification information of the item are transmitted to the information processing apparatus through the network; the recommended item to be presented to the user is prepared on the basis of a predicted preference value, transmitted from the information processing apparatus, for an item the preference value of which is not acquired; and the prepared recommended item is presented to the user, and therefore, it becomes possible to recommend the unestimated new item to the user.

In addition, according to the information processing apparatus and method of the invention, the recording medium, and the program, the predicted preference value for an item the preference value of which is not stored is calculated for each user on the basis of the stored preference values of two or more users and the stored reservation information of two or more users, and the calculated predicted preference value is transmitted to the corresponding user, and therefore, it becomes possible to recommend the unestimated new item to the user.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An information processing system, comprising:
   an information output apparatus for outputting a recommended item; and
   an information processing apparatus for managing the recommended item output by the information output apparatus;
   the information output apparatus including:
   a reception unit operable to receive designations of items from users;
   an acquisition unit operable to acquire preference values of the users for a specified one of the items;
   a first transmission unit operable to transmit identification information for identifying the specified item and the preference values of the users for the specified item to the information processing apparatus through a network;
   a second transmission unit operable to transmit reservation information for the specified item and the identification information for the specified item to the information processing apparatus through the network when the designations of the specified item are designations of reservations of the specified item;
   a preparation unit operable to prepare the recommended item to be presented to a user on the basis of a predicted preference value transmitted from the information processing apparatus when the acquisition unit does not acquire the preference value of the user for the specified item, and to prepare the recommended item to be presented to a user on the basis of the acquired preference value when the acquisition unit acquires the preference value of the user for the specified item; and
   a presentation unit operable to present to the user the recommended item prepared by the preparation unit; and
   the information processing apparatus including:
   a first storage unit operable to store the identification information for the specified item transmitted from the information output apparatus and the preference value of each user for the specified item;

a second storage unit operable to store the reservation information for the specified item transmitted from the information output apparatus and the identification information for the specified item for each user;

a calculation unit operable to calculate the predicted preference value for the specified item when the acquisition unit does not acquire the preference value of the user for the specified item and when the preference value of a user for the specified item is not stored in the first storage unit, the predicted preference value being calculated on the basis of the preference values of at least two users for the specified item stored in the first storage unit and the reservation information for the at least two users for the specified item stored in the second storage unit; and a third transmission unit operable to transmit to the user the predicted preference value for the specified item calculated by the calculation unit, wherein the items are transmission items and the predicted preference value is calculated by calculating at least one correlation value and calculating the predicted preference value on the basis of item reservation information and the at least one correlation value, each correlation value being calculated on the basis of degrees of preference of a first user for respective programs that have already been broadcast, degrees of preference of the first user for respective programs to be broadcast, degrees of preference of a second user for respective programs that have already been broadcast, and degrees of preference of the second user for respective programs to be broadcast.

2. An information processing system according to claim 1, wherein the specified item is selected from the group consisting of information, a commodity, a service, content and a broadcast program.

3. An information output apparatus, comprising:

a first reception unit operable to receive designations of items from users;

a first acquisition unit operable to acquire preference values of the users for each item;

a first transmission unit operable to transmit identification information for identifying the items and the preference values of the users for the items to an information processing apparatus through a network;

a second transmission unit operable to transmit reservation information for an item and the identification information for the item to the information processing apparatus through the network when the designations of the item are designations of reservations of the item;

a preparation unit operable to prepare a recommended item to be presented to a user on the basis of a predicted preference value transmitted from the information processing apparatus when the first acquisition unit does not acquire the preference value of the user for the item, and to prepare the recommended item to be presented to a user on the basis of the acquired preference value when the first acquisition unit acquires the preference value of the user for the item; and a presentation unit operable to present to the user the recommended item prepared by the preparation unit, wherein the items are transmission items and the predicted preference value is calculated by calculating at least one correlation value and calculating the predicted preference value on the basis of item reservation information and the at least one correlation value, each correlation value being calculated on the basis of degrees of preference of a first user for respective programs that have already been broadcast, degrees of preference of the first user for respective programs to be broadcast, degrees of preference of a second user for respective programs that have already been broadcast, and degrees of preference of the second user for respective programs to be broadcast.

4. The information output apparatus according to claim 3, further comprising:

a receiving unit operable to receive a list of items from the information processing apparatus; and a display unit operable to display the list of items, wherein the first reception unit receives the designations of the items from the users from among the list of items displayed by the display unit.

5. The information output apparatus according to claim 3, wherein the items are selected from the group consisting of information, a commodity, a service, and content.

6. The information output apparatus according to claim 3, wherein the items are broadcast programs.

7. The information output apparatus according to claim 6, further comprising:

a viewing unit operable to view the broadcast programs;

a recording unit operable to record the broadcast programs; and a reproduction unit operable to reproduce the broadcast programs.

8. The information output apparatus according to claim 7, further comprising:

a second acquisition unit operable to acquire information concerning a broadcasting time of a broadcast program;

a first calculation unit operable to calculate an accumulated viewing time during which the broadcast program is viewed by the viewing unit;

a second calculation unit operable to calculate a recording time during which the broadcast program is recorded by the recording unit;

a third calculation unit operable to calculate a reproduction time during which the broadcast program is reproduced by the reproduction unit;

a fourth calculation unit operable to calculate the preference value by dividing the accumulated viewing time by the broadcasting time of the broadcast program; and a fifth calculation unit operable to calculate the preference value by dividing the reproduction time by the recording time.

9. The information output apparatus according to claim 8, further comprising:

a second reception unit operable to receive an input of the preference values from the users; and a determination unit operable to determine whether the input of the preference values has been received by the second reception unit, wherein the first acquisition unit acquires a preference value input to the second reception unit when the determination unit determines that the input of the preference value has been received by the second reception unit, and acquires the preference value calculated by the fourth calculation unit or the fifth calculation unit when the determination unit determines that the input of the preference value has not been received by the second reception unit.

10. The information output apparatus according to claim 3, wherein the designation of the reservation is selected from the group consisting of a purchase reservation of information, service or content, a view reservation of a broadcast program, and a recording reservation of a broadcast program.

11. The information output apparatus according to claim 3, wherein the first transmission unit is operable to transmit information concerning the users together with the preference values.

12. The information output apparatus according to claim 11, wherein the information concerning the users includes at least one of plural pieces of information including an age, a gender, an address, a use language, and a taste.

13. An information output method, comprising the steps of:
receiving designations of items from users;
acquiring preference values of the users for a specified one of the items;
transmitting identification information for identifying the specified item and the preference values of the users for the specified item to an information processing apparatus through a network;
transmitting reservation information for the specified item and the identification information for the specified item to the information processing apparatus through the network when the designations of the specified item are designations of reservations of the specified item;
preparing a recommended item to be presented to a user on the basis of a predicted preference value transmitted from the information processing apparatus when the preference value of the user for the specified item is not acquired in the acquisition step, and preparing the recommended item to be presented to a user on the basis of the acquired preference value when the acquisition unit acquires the preference value of the user for the specified item in the acquisition step; and
presenting to the user the recommended item prepared by the preparation step,
wherein the items are transmission items and the predicted preference value is calculated by calculating at least one correlation value and calculating the predicted preference value on the basis of item reservation information and the at least one correlation value,
each correlation value being calculated on the basis of degrees of preference of a first user for respective programs that have already been broadcast, degrees of preference of the first user for respective programs to be broadcast, degrees of preference of a second user for respective programs that have already been broadcast, and degrees of preference of the second user for respective programs to be broadcast.

14. A non-transitory computer-readable medium storing a computer-readable program for implementing an information processing method, the method comprising the steps of:
receiving designations of items from users;
acquiring preference values of the users for a specified one of the items;
transmitting identification information for identifying the specified item and the preference values of the users for the specified item to an information processing apparatus through a network;
transmitting reservation information for the specified item and the identification information for the specified item to the information processing apparatus through the network when the designations of the specified item are designations of reservations of the specified item;
preparing a recommended item to be presented to a user on the basis of a predicted preference value transmitted from the information processing apparatus when the preference value of the user for the specified item is not acquired in the acquisition step, and preparing the recommended item to be presented to a user on the basis of the acquired preference value when the acquisition unit acquires the preference value of the user for the specified item in the acquisition step; and
presenting to the user the recommended item prepared by the preparation step,
wherein the items are transmission items and the predicted preference value is calculated by calculating at least one correlation value and calculating the predicted preference value on the basis of item reservation information and the at least one correlation value,
each correlation value being calculated on the basis of degrees of preference of a first user for respective programs that have already been broadcast, degrees of preference of the first user for respective programs to be broadcast, degrees of preference of a second user for respective programs that have already been broadcast, and degrees of preference of the second user for respective programs to be broadcast.

15. An information processing system, comprising:
a processor operable to execute instructions; and
instructions, the instructions including:
receiving designations of items from users;
acquiring preference values of the users for a specified one of the items;
transmitting identification information for identifying the specified item and the preference values of the users for the specified item to an information processing apparatus through a network;
transmitting reservation information for the specified item and the identification information for the specified item to the information processing apparatus through the network when the designations of the specified item are designations of reservations of the specified item;
preparing a recommended item to be presented to a user on the basis of a predicted preference value transmitted from the information processing apparatus when the preference value of the user for the specified item is not acquired in the acquisition step, and preparing the recommended item to be presented to a user on the basis of the acquired preference value when the acquisition unit acquires the preference value of the user for the specified item in the acquisition step; and
presenting to the user the recommended item prepared by the preparation step,
wherein the items are transmission items and the predicted preference value is calculated by calculating at least one correlation value and calculating the predicted preference value on the basis of item reservation information and the at least one correlation value,
each correlation value being calculated on the basis of degrees of preference of a first user for respective programs that have already been broadcast, degrees of preference of the first user for respective programs to be broadcast, degrees of preference of a second user for respective programs that have already been broadcast, and degrees of preference of the second user for respective programs to be broadcast.

16. An information processing apparatus, comprising:
a first storage unit operable to store for each user identification information for an item transmitted from an information output apparatus and a corresponding preference value for the item;
a second storage unit operable to store for each user reservation information for the item transmitted from the information output apparatus and corresponding identification information for the item;
a calculation unit operable to calculate a predicted preference value for the item when an acquisition unit does not acquire a preference value of a user for the item and when the preference value of a user for the item is not stored in the first storage unit, the predicted preference value being calculated on the basis of the preference values of at least two users for the item stored in the first storage unit and the reservation information for the at least two users for the item stored in the second storage unit; and a first transmission unit operable to transmit to the user the predicted preference value for the item calculated by the calculation unit, wherein the items are transmission items and the predicted preference value is calculated by calculating at least one correlation value and calculating the predicted preference value on the basis of item reservation information and the at least one correlation value, each correlation value being calculated on the basis of degrees of preference of a first user for respective programs that have already been broadcast, degrees of preference of the first user for respective programs to be broadcast, degrees of preference of a second user for respective programs that have already been broadcast, and degrees of preference of the second user for respective programs to be broadcast.

17. An information processing apparatus according to claim 16, wherein the calculation unit obtains correlations between one user and plural users other than the one user on the basis of the preference values of the plural users for one or more items, weights digitized values on the basis of the existence of reservations of the plural users for the one item according to heights of the correlations between the one user and the plural users, adds together the weighted digitized values for the plural users, and calculates the predicted preference value of the one user for the item when the preference value of the one user for the item is not stored in the first storage unit.

18. An information processing apparatus according to claim 16, further comprising:
a third storage unit operable to store a list of items to be displayed by the information output apparatus; and
a second transmission unit operable to transmit the list of items stored in the third storage unit to the information output apparatus.

19. An information processing apparatus according to claim 16, wherein the item is a broadcast program.

20. An information processing apparatus according to claim 16, wherein the item is selected from the group consisting of information, a commodity, a service, and content.

21. An information processing method, comprising the steps of:
storing for each user identification information for an item transmitted from an information output apparatus and a preference value for the item;
storing for each user reservation information for an item transmitted from the information output apparatus and corresponding identification information for the item;
calculating a predicted preference value for the item when an acquisition unit does not acquire a preference value of a user for the item and when the preference value of a user for the item is not stored in the first storage step, the predicted preference value being calculated on the basis of the preference values of at least two users for the item stored in the first storage step and the reservation information for the at least two users for the item stored in the second storage step; and
transmitting to the user the predicted preference value for the item calculated by the calculation step, wherein the items are transmission items and the predicted preference value is calculated by calculating at least one correlation value and calculating the predicted preference value on the basis of item reservation information and the at least one correlation value, each correlation value being calculated on the basis of degrees of preference of a first user for respective programs that have already been broadcast, degrees of preference of the first user for respective programs to be broadcast, degrees of preference of a second user for respective programs that have already been broadcast, and degrees of preference of the second user for respective programs to be broadcast.

22. A non-transitory computer-readable medium storing a computer-readable program for implementing an information processing method, the method comprising the steps of:
controlling for each user the storage of identification information for an item transmitted from an information output apparatus and a preference value for the item;
controlling for each user the storage of reservation information for an item transmitted from the information output apparatus and corresponding identification information for the item;
calculating a predicted preference value for the item when an acquisition unit does not acquire a preference value of a user for the item and when the preference value of a user for the item is not stored in the first storage control step, the predicted preference value being calculated on the basis of the preference values of at least two users for the item stored in the first storage control step and the reservation information for the at least two users for the item stored in the second storage control step; and
transmitting to the user the predicted preference value for the item calculated by the calculation step, wherein the items are transmission items and the predicted preference value is calculated by calculating at least one correlation value and calculating the predicted preference value on the basis of item reservation information and the at least one correlation value, each correlation value being calculated on the basis of degrees of preference of a first user for respective programs that have already been broadcast, degrees of preference of the first user for respective programs to be broadcast, degrees of preference of a second user for respective programs that have already been broadcast, and degrees of preference of the second user for respective programs to be broadcast.

23. An information processing system, comprising:
a processor operable to execute instructions; and
instructions, the instructions including:
controlling for each user the storage of identification information for an item transmitted from an information output apparatus and a preference value for the item;
controlling for each user the storage of reservation information for an item transmitted from the information output apparatus and corresponding identification information for the item;
calculating a predicted preference value for the item when an acquisition unit does not acquire a preference value of a user for the item and when the preference value of a user for the item is not stored in the first storage control step, the predicted preference value being calculated on the basis of the preference values of at least two users for the item stored in the first storage control step and the reservation information for the at least two users for the item stored in the second storage control step; and transmitting to the user the predicted preference value for the item calculated by the calculation step, wherein the items are transmission items and the predicted preference value is calculated by calculating at least one correlation value and calculating the predicted preference value on the basis of item reservation information and the at least one correlation value, each correlation value being calculated on the basis of degrees of preference of a first user for respective programs that have already been broadcast, degrees of preference of the first user for respective programs to be broadcast, degrees of preference of a second user for respective programs that have already been broadcast, and degrees of preference of the second user for respective programs to be broadcast.

* * * * *